United States Patent
Morita et al.

(10) Patent No.: US 11,352,482 B2
(45) Date of Patent: Jun. 7, 2022

(54) RUBBER COMPOSITION AND METHOD FOR PRODUCING SAME

(71) Applicant: NIPPON PAPER INDUSTRIES CO., LTD., Kita-ku (JP)

(72) Inventors: Masahiro Morita, Tokyo (JP); Yusuke Yasukawa, Tokyo (JP); Kotaro Ito, Tokyo (JP)

(73) Assignee: NIPPON PAPER INDUSTRIES CO., LTD., Kita-ku (JP)

( * ) Notice: Subject to any disclaimer, the term of this patent is extended or adjusted under 35 U.S.C. 154(b) by 307 days.

(21) Appl. No.: 16/481,622

(22) PCT Filed: Feb. 7, 2018

(86) PCT No.: PCT/JP2018/004266
§ 371 (c)(1),
(2) Date: Jul. 29, 2019

(87) PCT Pub. No.: WO2018/147342
PCT Pub. Date: Aug. 16, 2018

(65) Prior Publication Data
US 2020/0362146 A1    Nov. 19, 2020

(30) Foreign Application Priority Data

Feb. 9, 2017    (JP) .............................. JP2017-022495

(51) Int. Cl.
*C08L 1/02*    (2006.01)
*C08L 7/02*    (2006.01)

(52) U.S. Cl.
CPC .. *C08L 1/02* (2013.01); *C08L 7/02* (2013.01)

(58) Field of Classification Search
CPC ..................................... C08L 1/02; C08L 7/02
USPC .......................................................... 524/13
See application file for complete search history.

(56) References Cited

U.S. PATENT DOCUMENTS

| | | | |
|---|---|---|---|
| 6,433,089 B1 * | 8/2002 | Nishihara | C08J 3/244 525/191 |
| 8,980,980 B2 | 3/2015 | Tochika | |
| 9,771,461 B2 | 9/2017 | Kawamoto et al. | |
| 2007/0241480 A1 | 10/2007 | Kanenari et al. | |
| 2015/0368108 A1 | 12/2015 | Sone | |

FOREIGN PATENT DOCUMENTS

| | | | | |
|---|---|---|---|---|
| CN | 104936895 A | | 9/2015 | |
| EP | 309815 | * | 11/2016 | |
| JP | 2006-206864 A | | 8/2006 | |
| JP | 2009-191198 A | | 8/2009 | |
| JP | 2012-188494 A | | 10/2012 | |
| JP | 2014-1361 A | * | 1/2014 | |
| JP | 2014-125607 A | | 7/2014 | |
| JP | 2014/141637 A | | 8/2014 | |
| JP | 2014/208721 A | | 11/2014 | |
| JP | 2015-98576 A | | 5/2015 | |
| WO | WO 2014/115560 A1 | | 7/2014 | |
| WO | WO-2015050117 A1 | * | 4/2015 | ............. C08L 1/286 |

OTHER PUBLICATIONS

Combined Chinese Office Action and Search Report dated Jan. 15, 2021 in corresponding Chinese Patent Application No. 201880010628.6 (with English Translation and English Translation of Category of Cited Documents), 14 pages.
Extended European Search Report dated Aug. 5, 2020 in corresponding European Patent Application No. 18751620.8, 37 pages.
Database WPI, Week 201474, Thomson Scientific, London, GB; AN 2014-U21626 & JP 2014 208721 A (Olympus Corp), Nov. 6, 2014, 2 pages.
Database WPI, Week 201453, Thomson Scientific, London, GB; AN 2014-P38319 & JP 2014 141637 A (Mitsubishi Chem Co Ltd), Aug. 7, 2014, 2 pages.
International Search Report dated Apr. 10, 2018 in PCT/JP2018/004266 filed on Feb. 7, 2018.

* cited by examiner

*Primary Examiner* — Deve V Hall
(74) *Attorney, Agent, or Firm* — Oblon, McClelland, Maier & Neustadt, L.L.P.

(57) ABSTRACT

An object of the present invention is to provide a rubber composition including a rubber component and cellulose-based fibers and having excellent strength. Namely, the present invention provides a rubber composition including Component (A): a modified cellulose nanofiber, Component (B): a surfactant, Component (C): a polyvalent metal, and Component (D): a rubber component and a method for producing the same. Component (A) preferably includes a carboxy group-containing cellulose nanofiber such as an oxidized cellulose nanofiber and a carboxymethylated cellulose nanofiber.

10 Claims, No Drawings

RUBBER COMPOSITION AND METHOD FOR PRODUCING SAME

FIELD

The present invention relates to a rubber composition, and in particular, relates to a rubber composition including a modified cellulose nanofiber and a method for producing the same.

BACKGROUND

Rubber compositions including a rubber component and a cellulose-based fiber have been known to have excellent mechanical strength. For example, Patent Literature 1 illustrates that a rubber/short fiber-masterbatch in which short fibers are uniformly dispersed in rubber can be obtained by mixing a dispersion liquid obtained by fibrillating the short fiber having an average fiber diameter of smaller than 0.5 μm in water with a rubber latex and drying the resultant mixture and that a rubber composition having excellent balance of rubber reinforcing properties and fatigue resistance can be produced from the masterbatch.

Generally, the rubber component has low compatibility with cellulose-based fiber. For example, Patent Literature 2 illustrates that dispersibility becomes better by adding a cellulose nanofiber and a silane coupling agent in the rubber component. Patent Literature 3 illustrates that modified fine cellulose fiber obtained by treating fine carboxy group-containing cellulose fiber having a predetermined amount of carboxy group with a hydrophobic modification treatment agent having a hydrocarbon group have excellent dispersibility in the rubber component during blending with the rubber component.

CITATION LIST

Patent Literature

Patent Literature 1: Japanese Patent Application Laid-open No. 2006-206864

Patent Literature 2: Japanese Patent Application Laid-open No. 2009-191198

Patent Literature 3: Japanese Patent Application Laid-open No. 2014-125607

SUMMARY

Technical Problem

Further improvement in strength, however, is required for applying the conventional rubber composition including the rubber component and the cellulose-based fiber in various fields. In industrial production of rubber, a masterbatch is obtained by coagulating a latex. In the case of the rubber composition including cellulose-based fiber, problems of difficulty in obtaining a uniform masterbatch due to separation of the cellulose-based fiber during the coagulation process and, in addition, reduction in a reinforcement effect of the cellulose fiber in vulcanized rubber arise.

Accordingly, an object of the present invention is to provide a rubber composition having excellent strength and including a rubber component and cellulose-based fiber.

Solution to Problem

The present invention provides the followings [1] to [13].

[1] A rubber composition comprising the following Components (A) to (D):
Component (A): a modified cellulose nanofiber;
Component (B): a surfactant;
Component (C): a polyvalent metal; and
Component (D): a rubber component.

[2] The composition according to [1], wherein Component (A) comprises an oxidized cellulose nanofiber.

[3] The composition according to [2], wherein the content of carboxy groups in the oxidized cellulose nanofiber is from 0.5 mmol/g to 3.0 mmol/g relative to the bone-dry mass of the oxidized cellulose nanofiber.

[4] The composition according to [1], wherein Component (A) comprises a carboxymethylated cellulose nanofiber.

[5] The composition according to [4], wherein a degree of substitution with carboxymethyl group per glucose unit of the carboxymethylated cellulose nanofiber is 0.01 to 0.50.

[6] The composition according to any one of [1] to [5], wherein Component (B) comprises a cationic surfactant or an amphoteric surfactant.

[7] The composition according to [6], wherein Component (B) comprises an aliphatic amine.

[8] The composition according to [7], wherein Component (B) comprises at least one aliphatic amine selected from the group consisting of oleylamine, stearylamine, tetradecylamine, 1-hexenylamine, 1-dodecenylamine, 9,12-octadecadienylamine), 9,12,15-octadecatrienylamine, linoleylamine, dodecylamine, and propylamine.

[9] The composition according to any one of [1] to [8], wherein Component (C) comprises at least one metal selected from divalent and trivalent metals.

[10] The composition according to any one of [1] to [9], wherein Component (D) comprises at least one rubber selected from the group consisting of natural rubber, modified natural rubber, synthetic rubber, and modified synthetic rubber.

[11] A method for producing a rubber composition, the method comprising:
a step of obtaining a mixture by mixing a rubber component with a modified cellulose nanofiber;
a step of adding a surfactant to the mixture; and
a step of adding a polyvalent metal to the mixture and coagulating the resultant mixture to obtain a coagulated product.

[12] The method according to [11], further comprising dehydrating after the coagulating.

[13] The method according to [11] or [12], further comprising vulcanizing the coagulated product.

Advantageous Effects of Invention

According to the present invention, a rubber composition including a rubber component and a modified cellulose nanofiber and having excellent strength and a method for producing the same are provided.

DESCRIPTION OF EMBODIMENTS

The rubber composition according to the present invention includes the following Components (A) to (D):
Component (A): a modified cellulose nanofiber;
Component (B): a surfactant;
Component (C): a polyvalent metal; and
Component (D): a rubber component.

<Component (A): Modified Cellulose Nanofiber>

The modified cellulose nanofiber refers to fine fiber in which modified cellulose serves as a raw material. The average fiber diameter of the modified cellulose nanofiber is not particularly limited. The length weighted average fiber diameter is usually about 2 nm to about 500 nm and preferably 2 nm to 50 nm. The average fiber length of the modified cellulose nanofiber is not particularly limited. The weighted average fiber length is preferably 50 nm to 2,000 nm. The length weighted average fiber diameter and the length weighted average fiber length (hereinafter, also simply referred to as an "average fiber diameter" and an "average fiber length") are determined by observing the individual fibers using an atomic force microscope (AFM) or a transmission electron microscope (TEM). The average aspect ratio of the modified cellulose nanofiber is 10 or higher. The upper limit is not particularly limited and is 1,000 or lower. The average aspect ratio can be calculated in accordance with the following formula.

$$\text{Average aspect ratio} = \text{Average fiber length} / \text{Average fiber diameter} \quad \text{(Formula)}$$

The modified cellulose is obtained by modifying the cellulose included in cellulose-based raw materials. The cellulose-based raw materials may be materials including cellulose and are not particularly limited. Examples of the cellulose-based raw material include plants, animals (for example, ascidians), algaes, microorganisms (for example, acetic acid bacteria (*Acetobacter*)), and products originated from microbial products. Examples of the cellulose-based raw materials originated from plants include wood, bamboo, hemp, jute, kenaf, agricultural land residual wastes, cloth, and pulp (for example, unbleached softwood kraft pulp (Nadelholz unbleached kraft pulp (NUKP)), bleached softwood kraft pulp (Nadelholz bleached kraft pulp (NBKP)), unbleached hardwood kraft pulp (Laubholz unbleached kraft pulp (LUKP)), bleached hardwood kraft pulp (Laubholz bleached kraft pulp (LBKP)), unbleached softwood sulfite pulp (Nadelholz unbleached sulfite pulp (NUSP)), bleached softwood sulfite pulp (Nadelholz bleached sulfite pulp (NBSP)), thermomechanical pulp (TMP), regenerated pulp, and waste paper). The cellulose-based raw materials may be any one of the raw materials or a combination of two or more cellulose-based raw materials. The cellulose-based raw materials originated from plants or microorganisms are preferable, the cellulose-based raw materials originated from plants are more preferable, and pulps are further preferable.

The cellulose-based raw materials usually include fibrous cellulose (cellulose-based fiber). The average fiber diameter of the cellulose-based fiber is not particularly limited. The average fiber diameter of the cellulose-based raw material originated from softwood kraft pulp, which is a common pulp, is usually about 30 μm to about 60 μm and the average fiber diameter of the cellulose-based raw material originated from hardwood kraft pulp is usually about 10 μm to about 30 μm. The average fiber diameter of the cellulose-based raw materials originated from pulp made through general purification other than the softwood kraft pulp and the hardwood kraft pulp is usually about 50 μm.

Cellulose has three hydroxy groups per glucose unit and can be variously modified. Examples of the modification (usually chemical modification) include oxidation, etherification, esterification such as phosphorylation, silane coupling, fluorination, and cationization. Of these modifications, oxidation (carboxylation), etherification (for example, carboxymethylation), cationization, and esterification are preferable and oxidation (carboxylatation) and carboxymethylation are more preferable.

[Oxidation (Carboxylatation)]

The modified cellulose (oxidized cellulose) and the modified cellulose nanofiber (oxidized cellulose nanofiber) obtained through oxidation preferably have a structure in which at least one of the hydroxy groups in cellulose is selectively oxidized.

In the oxidized cellulose nanofiber, at least one of the hydroxy groups in a glucopyranose ring constituting the cellulose preferably has a carboxy group and a 6-position carbon atom in at least one glucopyranose ring constituting the cellulose is more preferably a carbonyl carbon in a carboxy group.

The amount of the carboxy group in the oxidized cellulose and the oxidized cellulose nanofiber is preferably 0.5 mmol/g or larger, more preferably 0.6 mol/g or larger or 0.8 mmol/g or larger, and further more preferably 1.0 mmol/g or larger relative to the bone-dry mass. The upper limit of this amount is preferably 3.0 mmol/g or smaller, more preferably 2.5 mmol/g or smaller, and further preferably 2.0 mmol/g or smaller. Therefore, this amount is preferably from 0.5 mmol/g to 3.0 mmol/g, more preferably from 0.6 mmol/g to 2.0 mmol/g or from 0.8 mmol/g to 2.5 mmol/g, and further preferably from 1.0 mmol/g to 2.0 mmol/g. The amount of the carboxy group in the oxidized cellulose nanofiber usually has the same value as the value of the oxidized cellulose before defibration.

An example of a method for measuring the amount of the carboxy group will be described below. As an aqueous dispersion liquid, 60 mL of a 0.5% by mass slurry of the oxidized cellulose is prepared, and a 0.1 M hydrochloric acid aqueous solution is added to the slurry to adjust the pH to 2.5. Thereafter, a 0.05 N sodium hydroxide aqueous solution is added dropwise to the slurry and the electric conductivity is measured until the pH reaches 11. The amount of the carboxy group can be calculated in accordance with the following formula from the amount of sodium hydroxide (a) consumed in the neutralization stage of the weak acid in which the electric conductivity is gradually changed.

$$\text{Amount of carboxy group[mmol/g in oxidized cellulose or oxidized cellulose nanofiber]} = a[\text{mL}] \times 0.05 / \text{Mass of oxidized cellulose or oxidized cellulose nanofiber[g]} \quad \text{(Formula)}$$

The method of the oxidation is not particularly limited. Examples of the method for oxidizing the cellulose-based raw material include a method in which the cellulose-based raw material is oxidized in water using an oxidizing agent in the presence of an N-oxyl compound and at least either bromide or iodide. According to this method, a carbon atom having the primary hydroxy group at the C6-position of the glucopyranose ring on the cellulose surface is selectively oxidized to produce a group selected from the group consisting of an aldehyde group, a carboxy group, and a carboxylate group. The concentration of the cellulose-based raw material during the reaction is not particularly limited and is preferably 5% by mass or lower.

The N-oxyl compound refers to a compound capable of generating a nitroxy radical. Examples of the N-oxyl compound include 2,2,6,6-tetramethyl-1-piperidine-N-oxy radical (hereinafter, referred to as "TEMPO") or 4-hydroxy-2,2,6,6-tetramethyl-1-piperidine-N-oxy radical (hereinafter, referred to as "4-hydroxy TEMPO"). As the N-oxyl compound, any compounds can be used as long as the compound promotes the target oxidation reaction.

The amount of the N-oxyl compound to be used may be an amount that catalyzes oxidization reaction of the cellulose serving as a raw material. For example, the amount is preferably 0.01 mmol or larger and more preferably 0.02 mmol or larger relative to 1 g of the bone-dry cellulose. The upper limit of the amount is preferably 10 mmol or smaller, more preferably 1 mmol or smaller, and further preferably 0.5 mmol or smaller. Therefore, the amount of the N-oxyl compound to be used is preferably from 0.01 mmol to 10 mmol, more preferably from 0.01 mmol to 1 mmol, and further preferably from 0.02 mmol to 0.5 mmol relative to 1 g of the bone-dry cellulose.

The bromide is a compound containing bromine and examples of the bromide include alkali metal bromides which can be ionized by dissociation in water. In addition, the iodide is a compound containing iodine and examples of the iodide include alkali metal iodides. The amount of the bromide or the iodide to be used is not particularly limited and can be selected within a range that can promote the oxidation reaction. The total amount of the bromide and the iodide is preferably 0.1 mmol or larger and more preferably 0.5 mmol or larger relative to 1 g of bone-dry cellulose. The upper limit of this amount is preferably 100 mmol or smaller, more preferably 10 mmol or smaller, and further preferably 5 mmol or smaller. Therefore, the total amount of the bromide and the iodide is preferably from 0.1 mmol to 100 mmol, more preferably from 0.1 mmol to 10 mmol, and further preferably from 0.5 mmol to 5 mmol relative to 1 g of the bone-dry cellulose.

The oxidizing agent is not particularly limited and examples of the oxidizing agent include halogens, hypohalous acids, halous acids, perhalogen acids, salts thereof, halogen oxides, and peroxides. Of these compounds, the hypohalous acids or the salts thereof are preferable, hypochlorous acid or the salts thereof are more preferable, and sodium hypochlorite is further preferable because these materials are inexpensive and have low environmental load. The amount of the oxidizing agent to be used is preferably 0.5 mmol or larger, more preferably 1 mmol or larger, and further preferably from 3 mmol or larger relative to 1 g of the bone-dry cellulose. The upper limit of this amount is preferably 500 mmol or smaller, more preferably 50 mmol or smaller, further preferably 25 mmol or smaller, and further more preferably 10 mmol or smaller. Therefore, the amount of the oxidizing agent to be used is preferably from 0.5 mmol to 500 mmol, more preferably from 0.5 mmol to 50 mmol, further preferably from 1 mmol to 25 mmol, and further more preferably from 3 mmol to 10 mmol relative to 1 g of the bone-dry cellulose. In the case where the N-oxyl compound is used, the amount of the oxidizing agent to be used is preferably 1 mol or larger relative to 1 mol of the N-oxyl compound and the upper limit of the amount is preferably 40 mol or smaller. Therefore, the amount of the oxidizing agent to be used is preferably from 1 mol to 40 mol relative to 1 mol of the N-oxyl compound.

Conditions such as pH and temperature during the oxidation reaction are not particularly limited. In general, the oxidation reaction proceeds efficiently even under relatively mild conditions. The reaction temperature is preferably 4° C. or higher and more preferably 15° C. or higher. The upper limit of this temperature is preferably 40° C. or lower and more preferably 30° C. or lower. Therefore, the reaction temperature is preferably from 4° C. to 40° C. and may be from about 15° C. to about 30° C., that is, room temperature. The pH of the reaction liquid is preferably 8 or higher and more preferably 10 or higher. The upper limit of the pH is preferably 12 or lower and more preferably 11 or lower. Therefore, the pH of the reaction liquid is preferably from about 8 to about 12 and more preferably from about 10 to about 11. Usually, as the oxidation reaction progresses, carboxy groups are generated in the cellulose, so that the pH of the reaction solution tends to be lowered. Therefore, in order to efficiently promote the oxidation reaction, the pH of the reaction solution is preferably maintained within the above range by adding an alkaline aqueous solution such as an aqueous sodium hydroxide solution. The reaction medium during oxidation is preferably water from the reason of easy handling and difficulty in occurrence of side reactions.

The reaction time in the oxidation reaction can be appropriately set in accordance with the degree of progression of oxidation and is usually 0.5 hour or longer. The upper limit of the reaction time is usually 6 hours or shorter and preferably 4 hours or shorter. Therefore, the reaction time in the oxidation reaction is usually from about 0.5 hour to about 6 hours and preferably from about 0.5 hour to about 4 hours. The oxidation may be carried out separately in two or more stages of reactions. For example, by oxidizing the oxidized cellulose obtained by filtering after the completion of the reaction in the first stage again under the same or different reaction conditions, the oxidized cellulose can be efficiently oxidized without reaction inhibition caused by sodium chloride produced as a by-product in the first stage reaction.

As another example of the carboxylation (oxidation) method, ozone oxidation is exemplified. By this oxidation reaction, the carbons having at least the hydroxy groups at 2-position and 6-position of the glucopyranose ring constituting cellulose are oxidized and, at the same time, decomposition of the cellulose chain occurs. The ozone treatment is usually carried out by contacting a gas including ozone with the cellulose-based raw material.

The ozone treatment is usually carried out by contacting a gas including ozone with the cellulose-based raw material. The ozone concentration in the gas is preferably 50 g/m$^3$ or higher. The upper limit of the ozone concentration is preferably 250 g/m$^3$ or lower and more preferably 220 g/m$^3$ or lower. Therefore, the ozone concentration in the gas is preferably from 50 g/m$^3$ to 250 g/m$^3$ and more preferably from 50 g/m$^3$ to 220 g/m$^3$. The amount of ozone to be added is preferably 0.1 part by mass or larger and more preferably 5 parts by mass or larger relative to 100 parts by mass of the solid content of the cellulose-based raw material. The upper limit of the amount is usually 30 parts by mass or smaller. Therefore, the amount of ozone to be added is preferably from 0.1 part by mass to 30 parts by mass and more preferably 5 parts by mass to 30 parts by mass relative to 100 parts by mass of the solid content of the cellulose-based raw material. The ozone treatment temperature is usually 0° C. or higher and preferably 20° C. or higher. The upper limit of this temperature is usually 50° C. or lower. Therefore, the ozone treatment temperature is preferably from 0° C. to 50° C. and more preferably from 20° C. to 50° C. The ozone treatment time is usually 1 minute or longer and preferably 30 minutes or longer. The upper limit of this time is usually 360 minutes or shorter. Therefore, the ozone treatment time is usually from about 1 minute to about 360 minutes and more preferably from about 30 minutes to about 360 minutes. The ozone treatment conditions within the ranges described above can prevent excessive oxidization and decomposition of the cellulose and may improve the yield of oxidized cellulose.

The ozone-treated cellulose may be further additionally oxidized using an oxidizing agent. The oxidizing agent used for the additional oxidizing treatment is not particularly limited. Examples of the oxidizing agent include chlorine-based compounds such as chlorine dioxide and sodium chlorite, oxygen, hydrogen peroxide, persulfuric acid, and peracetic acid. Examples of methods for the additional oxidation treatment include a method for preparing an oxidizing agent solution by dissolving the oxidizing agent in water or a polar organic solvent such as alcohol, and immersing the cellulose-based raw material in the oxidizing agent solution. The amount of the carboxy group, the carboxylate group, and the aldehyde group contained in the oxidized cellulose nanofiber can be adjusted by controlling oxidizing conditions such as the amount of the oxidizing agent to be added and the reaction time.

The product after the oxidation is preferably subjected to desalting treatment. The desalting may be carried out at any time before defibration and after defibration described below. The desalting means that the salt (for example, a sodium salt) contained in the reaction product (salt form) is replaced with a proton to form an acid type product. Examples of desalting method after the oxidation include a method for adjusting the system to acidic and a method for contacting the modified cellulose or the modified cellulose nanofiber with a cation exchange resin. In the case where the system is adjusted to acidic, pH of the system is preferably adjusted from 2 to 6, more preferably from 2 to 5, and further preferably from 2.3 to 5. In order to adjust the system to acidic, an acid (for example, inorganic acids such as sulfuric acid, hydrochloric acid, nitric acid, sulfurous acid, nitrous acid, or phosphoric acid; and organic acids such as acetic acid, lactic acid, oxalic acid, citric acid, or formic acid) is usually used. After addition of the acid, the resultant mixture may be subjected to an appropriate washing treatment. As the cation exchange resins, either strongly acidic ion-exchange resins or weakly acidic ion-exchange resins may be used as long as the counterions are $H^+$. The ratio of the modified cellulose and the cation exchange resin when both are contacted with each other is not particularly limited. Those skilled in the art may appropriately set the ratio from the viewpoint that the proton substitution is efficiently carried out. The cation exchange resin after the contact may be recovered by conventional methods such as suction filtration.

[Etherification]

Examples of the etherification include etherification by carboxymethylation, etherification by methylation, etherification by ethylation, etherification by cyanoethylation, etherification by hydroxyethylation, etherification by hydroxypropylation, etherification by ethylhydroxyethylation, and etherification by hydroxypropylmethylation. As an example, a method of carboxymethylation will be described below.

The modified cellulose (carboxymethylated cellulose) and cellulose nanofiber (carboxymethylated cellulose nanofiber) obtained through carboxymethylation preferably have a structure in which at least one of the hydroxy groups in cellulose has a carboxymethylated structure.

The degree of substitution with carboxymethyl group per anhydrous glucose unit of the carboxymethylated cellulose and carboxymethylated cellulose nanofiber is preferably 0.01 or higher, more preferably 0.05 or higher, and further preferably 0.10 or higher. The upper limit of the degree of substitution is preferably 0.50 or lower, more preferably 0.40 or lower, and further preferably 0.35 or lower. Therefore, the degree of substitution with carboxymethyl group is preferably from 0.01 to 0.50, more preferably from 0.05 to 0.40, and further preferably from 0.10 to 0.35. The degree of substitution with carboxymethyl group of the carboxymethylated cellulose nanofiber usually has the same value as the value of the carboxymethylated cellulose before defibration.

The degree of substitution with carboxymethyl group per glucose unit is measured, for example, by the following method. Namely, 1) About 2.0 g of carboxymethylated cellulose (bone-dry) is precisely weighed and placed in a 300 mL stoppered Erlenmeyer flask. 2) To the placed carboxymethylated cellulose, 100 mL of liquid prepared by adding 100 mL of concentrated nitric acid (special grade) to 1,000 mL of methanol is added and the resultant mixture is shaken for 3 hours to prepare carboxymethylated cellulose having carboxy groups (hereinafter, referred to as acid type carboxymethylated cellulose) from the carboxymethyl cellulose salt (carboxymethylated cellulose). 3) Precisely 1.5 g to 2.0 g of the acid type carboxymethylated cellulose (bone-dry) is weighed and placed in a 300 mL stoppered Erlenmeyer flask. 4) The acid type carboxymethylated cellulose is wetted with 15 mL of 80% methanol and 100 mL of 0.1 N NaOH is added to the wetted mixture, followed by shaking the resultant mixture at room temperature for 3 hours. 5) The back titration of the excessive NaOH is carried out with 0.1 N $H_2SO_4$ using phenolphthalein as an indicator. 6) The degree of substitution with carboxymethyl group (DS) is calculated in accordance with the following formula:

$$A=[(100 \times F'-(0.1N\ H_2SO_4)(mL) \times F) \times 0.1]/(\text{Bone-dry mass of acid type carboxymethylated cellulose (g)})$$

$$DS=0.162 \times A/(1-0.058 \times A) \quad \text{(Formula)}$$

A: Amount of 1 N NaOH (mL) needed for neutralizing 1 g of acid type carboxymethylated cellulose
F: Factor of 0.1 N $H_2SO_4$
F': Factor of 0.1 N NaOH The method of carboxymethylation is not particularly limited. Examples of the method of carboxymethylation include a method in which the cellulose-based raw material serving as the starting material is mercerized and thereafter etherified. In this method, usually, a solvent is used. Examples of the solvent include water, alcohols (for example, lower alcohols), and mixed solvents thereof. Examples of the lower alcohol include methanol, ethanol, N-propyl alcohol, isopropyl alcohol, N-butyl alcohol, isobutyl alcohol, and tertiary butyl alcohol. The mixing ratio of the lower alcohol in the mixed solvent is preferably from 60% by mass to 95% by mass. The amount of the solvent is usually 3 times by mass or larger relative to the cellulose-based raw material. The upper limit of the amount is not particularly limited and is usually 20 times by mass or smaller. Therefore, the amount of the solvent is preferably from 3 times by mass to 20 times by mass.

The mercerization is usually carried out by mixing the starting material and the mercerizing agent. Examples of the mercerizing agent include alkali metal hydroxides such as sodium hydroxide and potassium hydroxide. The amount of the mercerizing agent to be used is preferably 0.5 times by mole or larger, more preferably 1.0 times by mole or larger, and further preferably 1.5 times by mole or larger per anhydrous glucose residue serving as the starting material. The upper limit of the amount is usually 20 times by mole or smaller, preferably 10 times by mole or smaller, and more preferably 5 times by mole or smaller. Therefore, the amount of the mercerizing agent to be used is preferably from 0.5 times by mole to 20 times by mole, more preferably from 1.0 times by mole to 10 times by mole, and further preferably from 1.5 times by mole to 5 times by mole.

The reaction temperature of the mercerization is usually 0° C. or higher and preferably 10° C. or higher. The upper limit of the reaction temperature is 70° C. or lower and preferably 60° C. or lower. Therefore, the reaction temperature is usually from 0° C. to 70° C. and preferably from 10° C. to 60° C. The reaction time is usually 15 minutes or longer and preferably 30 minutes or longer. The upper limit of the reaction time is usually 8 hours or shorter and preferably 7 hours or shorter. Therefore, the reaction time is usually from 15 minutes to 8 hours and preferably from 30 minutes to 7 hours.

The etherification reaction is usually carried out by adding a carboxymethylating agent to the reaction system after the mercerization. Preferable examples of the carboxymethylating agent include monochloroacetic acid and sodium monochloroacetate.

The amount of the carboxymethylating agent to be added is usually preferably 0.05 times by mole or larger, more preferably 0.5 times by mole or larger, and further preferably 0.8 times by mole or larger per glucose residue of the cellulose included in the cellulose-based raw material. The upper limit of the amount is usually 10.0 times by mole or smaller, preferably 5 times by mole or smaller, and more preferably 3 times by mole or smaller. Therefore, the amount of the carboxymethylating agent to be added is preferably from 0.05 times by mole to 10.0 times by mole, more preferably from 0.5 times by mole to 5 times by mole, and further preferably from 0.8 times by mass to 3 times by mole. The reaction temperature is usually 30° C. or higher and preferably 40° C. or higher. The upper limit of the reaction temperature is 90° C. or lower and preferably 80° C. or lower. Therefore, the reaction temperature is usually from 30° C. to 90° C. and preferably from 40° C. to 80° C. The reaction time is usually 30 minutes or longer and preferably 1 hour or longer. The upper limit of the reaction time is usually 10 hours or shorter and preferably 4 hours or shorter. Therefore, the reaction time is usually from 30 minutes to 10 hours and preferably from 1 hour to 4 hours. The reaction solution may be stirred during the carboxymethylation reaction, if necessary.

The product after the etherification is preferably subjected to desalting treatment. The desalting may be carried out at any time before and after defibration described below. The desalting means that the salt (for example, a sodium salt) contained in the reaction product (salt form) is replaced with a proton to form an acid type product. Examples of desalting method after the etherification (for example, carboxymethylation) include a method for contacting the modified cellulose or the modified cellulose nanofiber with the cation exchange resin. As the cation exchange resins, either strongly acidic ion-exchange resins or weakly acidic ion-exchange resins may be used as long as the counterions are H⁺. The ratio of the modified cellulose and the cation exchange resin when both are contacted with each other is not particularly limited. Those skilled in the art may appropriately set the ratio from the viewpoint that the proton substitution is efficiently carried out. As an example, the pH of the aqueous dispersion liquid after adding the cation exchange resin can be adjusted so as to be preferably from 2 to 6 and more preferably 2 to 5 with respect to the modified cellulose nanofiber aqueous dispersion liquid. The cation exchange resin after the contact may be recovered out by conventional methods such as suction filtration.

[Cationization]

The modified cellulose (cationized cellulose) and the cellulose nanofiber (cationized cellulose nanofiber) obtained through the cationization may contain at least one cationic group such as ammonium, phosphonium, and sulfonium or a group having the cationic group, preferably contain at least one group having ammonium, and more preferably contain at least one group having a quaternary ammonium.

The degree of substitution with cationic group per glucose unit of the cationized cellulose and cationized cellulose nanofiber is preferably 0.01 or higher, more preferably 0.02 or higher, and further preferably 0.03 or higher. The upper limit of the degree of substitution is preferably 0.40 or lower, more preferably 0.30 or lower, and further preferably 0.20 or lower. Therefore, the degree of substitution with cationic group is preferably from 0.01 to 0.40, more preferably from 0.02 to 0.30, and further preferably 0.03 to 0.20. Introduction of the cation substituent into cellulose causes electric repulsion of the cellulose with each other. Therefore, the modified cellulose (cationized cellulose) into which the cation substituent is introduced can be easily nano-defibrated. The modified cellulose having a degree of substitution with cationic group per glucose unit of 0.01 or higher can achieve sufficient nano-defibration. On the other hand, the modified cellulose having a degree of substitution with cationic group per glucose unit of 0.40 or lower allows swelling or dissolution to be reduced. This allows fiber form to be retained and thus the situation where a product cannot be obtained as nanofiber can be prevented. The degree of substitution with cationic group of the cationized cellulose nanofiber usually has the same value as the value of the cationized cellulose before defibration.

The degree of substitution with cationic group per glucose unit of the cationized cellulose and cationized cellulose nanofiber can be adjusted by the amount of the cationizing agent to be added and the composition ratio of water or alcohol. The degree of substitution with cationic group refers to the number of substituents introduced into per unit structure (a glucopyranose ring) constituting cellulose. Namely, the degree of substitution with cationic group is defined as a "value obtained by dividing the number of moles of the introduced substituent by the total number of moles of the hydroxy group in the glucopyranose ring". Pure cellulose has three hydroxy groups that can be substituted per unit structure (glucopyranose ring) and thus the theoretical maximum value of the degree of substitution with cationic group is 3 (the minimum value is 0).

An example of a method for measuring the degree of substitution with cationic group per glucose unit will be described below. After a sample (cationized cellulose) is dried, the nitrogen content is measured with a total nitrogen analyzer TN-10 (manufactured by Mitsubishi Chemical Corporation). For example, in the case where 3-chloro-2-hydroxypropyltrimethylammonium chloride is used as a cationizing agent, the degree of cationization is calculated in accordance with the following formula. The degree of substitution with cationic group can be determined as an average number of moles of the substituent per mole of the anhydrous glucose unit.

Degree of substitution with cationic group=(162×N)/(1−116×N)    (Formula)

N: nitrogen content (mol) per 1 g of cationized cellulose

The method of cationization is not particularly limited. Examples of the method include a method for reacting the cellulose-based raw material with the cationizing agent and a catalyst in the presence of water or alcohol. Examples of the cationizing agent include glycidyltrimethylamrnonium chloride, 3-chloro-2-hydroxypropyltrialkylammonium halides (for example, 3-chloro-2-hydroxypropyltrimethylammonium halide), and halohydrin-type compounds thereof. The canonized cellulose having a group containing a quaternary ammonium can be obtained by using any one of these cationizing agents. Examples of the catalyst include alkali metal hydroxides such as sodium hydroxide and potassium hydroxide. Examples of the alcohol include alcohols having a carbon number of 1 to 4. The amount of the cationizing agent is preferably 5 parts by mass or larger and more preferably 10 parts by mass or larger relative to 100 parts by mass of the cellulose-based raw material. The upper limit of the amount is usually 800 parts by mass or smaller and preferably 500 parts by mass or smaller. The amount of catalyst is preferably 0.5 part by mass or larger and more preferably 1 part by mass or larger relative to 100 parts by mass of the cellulose-based raw material. The upper limit of the amount is usually 20 parts by mass or smaller and preferably 15 parts by mass or smaller. The amount of alcohol is preferably 50 parts by mass or larger and more preferably 100 parts by mass or larger relative to 100 parts by mass of the cellulose-based raw material. The upper limit of the amount is usually 50,000 parts by mass or smaller and preferably 500 parts by mass or smaller.

The reaction temperature during the cationization is usually 10° C. or higher and preferably 30° C. or higher. The upper limit of the reaction temperature is 90° C. or lower and preferably 80° C. or lower. The reaction time is usually 10 minutes or longer and preferably 30 minutes or longer. The upper limit of the reaction time is usually 10 hours or shorter and preferably 5 hours or shorter. The reaction solution may be stirred during the cationization, if necessary.

The product after the cationization is preferably subjected to desalting treatment. The desalting may be carried out at any time before and after defibration described below. The desalting means that the salt (for example, Cl—) contained in the reaction product (salt font) is replaced with a base to form a base type product. Examples of desalting method after the cationization include a method for contacting the modified cellulose or the modified cellulose nanofiber with an anion exchange resin. As the anion exchange resins, either strongly basic ion-exchange resins or weakly basic ion-exchange resins may be used as long as the functional group is a basic type group. The ratio of the modified cellulose and the anion exchange resin when both are contacted with each other is not particularly limited. Those skilled in the art may appropriately set the ratio from the viewpoint that the base substitution is efficiently carried out. As an example, the pH of the aqueous dispersion liquid after adding the anion exchange resin can be adjusted so as to be preferably from 9 to 13 and more preferably 10 to 13 with respect to the modified cellulose nanofiber aqueous dispersion liquid. The anion exchange resin after the contact may be recovered by conventional methods such as suction filtration.

[Esterification]

The method of esterification is not particularly limited. Examples of the method include a method for reacting the cellulose-based raw material with a compound having a phosphoric acid group (a phosphoric acid esterification method). Examples of the phosphoric acid esterification method include a method for mixing the powder or aqueous solution of the compound having a phosphoric acid group to the cellulose-based raw material and a method for adding the aqueous solution of the compound having a phosphoric acid group to the slurry of the cellulose-based raw material. The latter method is preferable. This allows the uniformity of the reaction to be improved and the efficiency of the esterification to be improved.

Examples of the compound having a phosphoric acid group include phosphoric acid, polyphosphonic acid, phosphorous acid, phosphonic acid, polyphosphonic acid, and esters and salts thereof. These compounds are low cost and easy to handle and allows defibration efficiency to be improved by introducing phosphate groups into cellulose. Specific examples of the compound having a phosphoric acid group include phosphoric acid, sodium dihydrogen phosphate, disodium hydrogen phosphate, trisodium phosphate, sodium pyrophosphate, sodium metaphosphate, potassium dihydrogen phosphate, dipotassium hydrogen phosphate, tripotassium phosphate, potassium, pyrophosphate, potassium metaphosphate, ammonium dihydrogen phosphate, diammonium hydrogen phosphate, triammonium hydrogen phosphate, ammonium pyrophosphate, and ammonium metaphosphate. The compound having a phosphoric acid group may be used singly or in a combination of two or more of the compound. Of these compounds, phosphoric acid, the sodium salts of phosphoric acid, the potassium salts of phosphoric acid, and the ammonium salts of phosphoric acid are preferable, the sodium salts of phosphoric acid are more preferable, and sodium dihydrogen phosphate and disodium hydrogen phosphate are further preferable from the viewpoint of high efficiency of phosphate group introduction, easy defibration in the defibration process described below, and easy applicability in industry. In addition, the aqueous solution of the compound having a phosphoric acid group is preferably used in esterification because the uniformity of the reaction is improved and the efficiency of the phosphate group introduction is improved. The pH of the aqueous solution of the compound having a phosphoric acid group is preferably 7 or lower from the viewpoint of improving the efficiency of the phosphate group introduction. The pH is more preferably from 3 to 7 from the viewpoint of reducing hydrolysis of the pulp fiber.

The phosphoric acid esterification method will be described below with reference to one example. Phosphoric acid groups are introduced into cellulose by adding the compound having a phosphoric acid group into the suspension of the cellulose-based raw material (for example, a solid content concentration of 0.1% by mass to 10% by mass) with stirring the suspension. The amount of the compound having a phosphoric acid group to be added is preferably 0.2 part by mass or larger and more preferably 1 part by mass or larger in terms of the amount of phosphorus atoms, when the cellulose-based raw material is determined to be 100 parts by mass. This allows the yield of the esterified cellulose or the esterified cellulose nanofiber to be further improved. The upper limit of the amount is preferably 500 parts by mass or smaller and more preferably 400 parts by mass or smaller. Accordingly, the yield corresponding to the amount of the compound having a phosphoric acid group to be used can be efficiently obtained. Therefore, the amount is preferably from 0.2 part by mass to 500 parts by mass and more preferably 1 part by mass to 400 parts by mass.

In the case where the compound having a phosphoric acid group is reacted with the cellulose-based raw material, a basic compound may be further added to the reaction system. Examples of the method for adding the basic compound to the reaction system include a method for adding the basic compound to the slurry of the cellulose-based raw material, the aqueous solution of the compound having a phosphoric acid group, or the slurry of cellulose-based raw material and the compound having a phosphoric acid group.

The basic compound is not particularly limited and preferably exhibits basicity. Nitrogen-containing compounds indicating basicity are more preferable. The term "exhibits basicity" usually means that the aqueous solution of the basic compound in the presence of phenolphthalein indicator exhibits color of pink to red and/or the pH of the aqueous solution of the basic compound is higher than 7. The basic compound is preferably a compound having a nitrogen atom exhibiting basicity and more preferably a compound having an amino group exhibiting basicity. Examples of the compound having an amino group exhibiting basicity include urea, methylamine, ethylamine, trimethylamine, triethylamine, monoethanolamine, diethanolamine, triethanolamine, pyridine, ethylenediamine, and hexamethylenediamine. Of these compounds, urea is preferable from the viewpoint of low cost and easy handling. The amount of the basic compound to be added is preferably from 2 parts by mass to 1,000 parts by mass and more preferably from 100 parts by mass to 700 parts by mass. The reaction temperature is preferably from 0° C. to 95° C. and more preferably from 30° C. to 90° C. The reaction time is not particularly limited and is usually from about 1 minute to 600 minutes and preferably from 30 minutes to 480 minutes. The conditions of the esterification reaction within any of these ranges allow excessive esterification of cellulose, which causes easy dissolution, to be reduced and the yield of the phosphate-esterified cellulose to be improved.

After the compound having a phosphoric acid group is reacted with the cellulose-based raw material, usually a suspension of the phosphate-esterified cellulose or phosphate-esterified cellulose nanofiber is obtained. The suspension of the phosphate-esterified cellulose or phosphate-esterified cellulose nanofiber is dehydrated, if necessary. After the dehydrating, heating treatment is preferably carried out. This can reduce the hydrolysis of the cellulose. The heating temperature is preferably from 100° C. to 170° C. More preferably, the heating treatment is carried out at 130° C. or lower (further preferably, 110° C. or lower) while water is included during heating treatment and carried out from 100° C. to 170° C. after water is removed.

The phosphate group substituents are introduced into the cellulose by the phosphoric acid esterification reaction and the cellulose electrically repels with each other. Therefore, the phosphate-esterified cellulose can be easily defibrated to the cellulose nanofiber. The degree of substitution with the phosphate group per glucose unit of the phosphate-esterified cellulose is preferably 0.001 or higher. This can achieve sufficient defibration (for example, nano-defibration). The upper limit of the degree is preferably 0.40 or lower. This allows swelling or dissolution of the phosphate-esterified cellulose to be reduced and the occurrence of the situation where the cellulose nanofiber cannot be obtained to be reduced. Therefore, the degree of substitution with the phosphate group is preferably from 0.001 to 0.40. The degree of substitution with the phosphate group per glucose unit of the phosphate-esterified cellulose nanofiber is more preferably from 0.001 to 0.40.

The phosphate-esterified cellulose is preferably subjected to washing treatment such as washing with cold water after boiling. This allows the phosphate-esterified cellulose to be effectively defibrated.

[Defibration (Nano-Defibration)]

Defibration may be carried out for the cellulose-based raw material before modification or may be carried out for the modified cellulose. The latter is preferable because the energy required for the defibration by modification can be reduced. The defibration treatment may be carried out once or may be carried out more than once. In the case where the desalting treatment is carried out in the production of the modified cellulose or the modified cellulose nanofiber, the defibration may be carried out in each step of before and after the desalting.

Apparatuses used for defibration are not particularly limited. Examples of the apparatuses include a high-speed rotation type apparatus, a colloid mill type apparatus, a high pressure type apparatus, a roll mill type apparatus, and an ultrasonic type apparatus. A high pressure or ultrahigh pressure homogenizer is preferable and a wet type high pressure or ultrahigh pressure homogenizer is more preferable. These apparatuses are preferable because these apparatuses can apply strong shear force to the modified cellulose. The shear rate is preferably 1,000 $sec^{-1}$ or higher. This allows uniform nanofiber having less agglomerated structures to be formed. The pressure applied to the modified cellulose is preferably 50 MPa or higher, more preferably 100 MPa or higher, and further preferably 140 MPa or higher.

The defibration is usually carried out in a dispersion. The dispersion is usually aqueous dispersion such as an aqueous dispersion liquid. Before dispersing, pre-treatment may be carried out, if necessary. Examples of the pre-treatment include mixing, stirring, and emulsifying and the pre-treatment can be carried out using a known device (for example, a high shear mixer).

In the case where the defibration is carried out for the dispersion of the cellulose-based raw material or the dispersion of the modified cellulose, the lower limit of the solid content of the cellulose-based raw material or modified cellulose in the dispersion is usually 0.1% by mass or larger, preferably 0.2% by mass or larger, and more preferably 0.3% or larger. This makes the liquid amount relative to the amount of the cellulose-based raw material or the modified cellulose an appropriate amount, which is effective. The upper limit of the solid content is usually 10% by mass or smaller and preferably 6% by mass or smaller. This allows the flowability to be retained.

[Filtration]

Filtration may be carried out after the defibration, if necessary, and is preferably carried out after the defibration of the modified cellulose. Foreign matters such as non-defibrated fibers may remain in the dispersion liquid of the modified cellulose nanofiber due to insufficient defibration. Such foreign matters, however, can be removed by filtration. In the case where the rubber composition is formed in a state where the foreign matters remain, the rubber composition tends to break from the foreign matter acting as the starting point and thus lowering in strength or the like may occur. Filtration can prevent such a disadvantage.

Examples of the filtration treatment include treatment of pressure filtration or vacuum filtration of the dispersion (usually, an aqueous dispersion liquid) of the modified cellulose nanofiber by applying a pressure difference of 0.01 MPa or larger and preferably from 0.01 MPa to 10 MPa. By applying the pressure difference of 0.01 MPa or larger, a sufficient filtration processing amount can be obtained without significant dilution (considering the subsequent processes, it is preferable that the dilution be not carried out). By applying the differential pressure from 0.01 MPa to 10 MPa, the sufficient filtration processing amount can also be obtained even when the concentration of the modified cellulose nanofiber in the dispersion or the viscosity of the dispersion is high. The concentration of the modified cellulose nanofiber in the dispersion liquid of the modified cellulose nanofiber during the filtration is usually from 0.1% by mass to 5% by mass, preferably from 0.2% by mass to 4% by mass, and more preferably from 0.5% by mass to 3% by mass. Examples of the apparatus used for the filtration include a Nutsche-type apparatus, a candle-type apparatus, a leaf disc-type apparatus, a drum-type apparatus, a filter press-type apparatus, and a belt filter-type apparatus.

The filtration treatment amount per 1 hour is preferably 10 $L/m^2$ or larger and more preferably 100 $L/m^2$ or larger. Examples of methods of filtration include aid filtration using a filter aid and filter media filtration using a porous filter media. The filtering may be carried out by selecting one of the filtering methods or two or more of the filtration methods may be used in a combination. In this case, the order of the filtration method may be arbitrarily selected. In the case where two or more of the filtration processes are carried out, any one of the filtration processes may be carried out under the above-described filtration pressure difference or all filtration processes are carried out in the above-described filtration pressure difference.

Of these filtration methods, the aid filtration using the filter aid is preferable. According to this method, the clogged product of the filter media generated in the filtration process can be easily eliminated by removing the filtration layer formed of a filter aid and thus a continuous filtration process can be carried out. As the filter aid, substantially granulated products are preferable. The average particle diameter of the granulated products is preferably 150 μm or smaller, and more preferably from 1 μm to 150 μm, further preferably from 10 μm to 75 μm, further more preferably 15 μm to 45 μm, and particularly preferably 25 μm to 45 μm. The granulated product having an average particle diameter of larger than 1 μm can reduce the decrease in the filtration rate. The granulated product having an average particle diameter of smaller than 150 μm allows the foreign matter to be sufficiently captured and the filtration treatment to be effectively carried out.

As described below, the filter aid may have a variety of shapes such as a substantially spherical shape that diatomaceous earth has and a bar-like shape that powdered cellulose has. In any case, the average particle diameter can be measured by a laser diffraction type measuring device in accordance with JIS Z8825-1.

As the aid filtration using the filter aid, either pre-coat filtration of forming the layer of the filter aid on the filter medium or body-feed filtration of previously mixing the filter aid and the dispersion of the modified cellulose nanofiber and filtering the resultant mixture may be carried out or the aid filtration may be carried out in a combination of both filtrations. The combination of both filtrations is more preferable because the throughput is improved and the quality of the filtrate is excellent. Multistage aid filtration may be carried out by changing the type of the filter aid. In the case where two or more stages of filtration processes are carried out using the filter aid, any one of the filtration processes may be carried out under the above-described filtration pressure difference or all filtration processes are carried out in the above-described filtration pressure difference.

As the filter aid, either inorganic compound or organic compound may be used and the filter aid is preferably a granulated product. Suitable examples of the filter aid include diatomaceous earth, powdered cellulose, perlite, and activated carbon.

The diatomaceous earth refers to the soft rock or soil mainly made of the shells of diatoms and the main component thereof is silica. Alumina, iron oxides, and the oxides of alkali metals may be included other than silica. The diatomaceous earth is porous and has a high porosity. Diatomaceous earth having a cake bulk density of about 0.2 $g/cm^3$ to about 0.45 $g/cm^3$ is preferable. Of the diatomaceous earths, calcined products and flux-calcined products are preferable and, in addition, freshwater diatomaceous earths are preferable. Examples of such diatomaceous earth include Celite (registered trademark) manufactured by Celite Corporation and Celatom (registered trademark) manufactured by Eagle Picher Minerals Inc.

The powdered cellulose refers to rod shaft-like particles made of microcrystalline cellulose obtained by removing the amorphous part of the wood pulp by an acid hydrolysis treatment and thereafter pulverizing and sieving the treated wood pulp. The degree of polymerization of the cellulose in the powdered cellulose is preferably from about 100 to about 500. The degree of crystallization of the powdered cellulose measured by an X-ray diffraction method is preferably from 70% to 90%. The volume average particle diameter measured by a laser diffraction type particle size distribution measuring apparatus is preferably 100 μm or smaller and more preferably 50 μm or smaller. The powdered cellulose having a volume average particle diameter of 100 μm or smaller allows a cellulose nanofiber dispersion liquid having excellent fluidity to be obtained. Examples of the powdered cellulose include crystalline cellulose powder having a rod shaft-like shape and a constant particle diameter distribution produced by a method of purifying and drying undecomposed residue obtained after acid hydrolysis of refining pulp and pulverizing and sieving the dried undecomposed residue, KC Flock (registered trademark) manufactured by Nippon Paper Industries Co., Ltd., CEOLUS (registered trademark) manufactured by Asahi Kasei Chemicals Corporation, and Avicel (registered trademark) manufactured by FMC Corporation.

Examples of the filter media include filters, membranes, filter clothes made of materials such as metal fibers, cellulose, polypropylene, polyester, nylon, glass, cotton, polytetrafluoroethylene, and polyphenylene sulfide, filters made by sintering metal powder, or slit-like filters. Of these filter media, the metal filter or the membrane filter is preferable.

The preferable average pore diameter of the filter medium is not particularly limited in the case where the filter medium is used in combination with the filter aid. On the other hand, the average pore diameter of the filter medium is preferably from 0.01 μm to 100 μm, more preferably from 0.1 μm to 50 μm, and further preferably from 1 μm to 30 μm in the case where the filter aid is not used together and the filtration is carried out using the filter medium alone. The filter medium having an average pore diameter of smaller than 0.01 μm may provide an insufficient filtration rate. On the other hand, the filter medium having an average pore diameter of larger than 100 μm may cause difficulty in obtaining a sufficient filtration effect because such filter medium may not catch foreign matters sufficiently.

The dispersibility of the modified cellulose nanofiber dispersion liquid after filtration is preferably evaluated by the following method. The surface tension adjusting agent is added to the modified cellulose nanofiber dispersion liquid and thereafter a thin film of the resultant mixture is formed. On both surfaces of the thin film, a pair of polarizing plates are placed so that the polarization axes are orthogonal to each other. Light emits from one side of the polarization plate and the transmitted image is captured from the other side of the polarization plate. A foreign matter area is identified by analyzing the image by image analysis to calculate the foreign substance area ratio per 1 g of bone-dry mass of the cellulose nanofiber. The cellulose nanofiber dispersion liquid after filtration preferably has a foreign matter area ratio of 25% or lower in this evaluation method.

Component (A) may be one type of the modified cellulose nanofiber or a combination of two or more types of the modified cellulose nanofibers. The component (A) preferably includes at least one type of the carboxy group-containing cellulose nanofiber such as the oxidized cellulose nanofiber and the carboxymethylated cellulose nanofiber and more preferably includes at least the oxidized cellulose nanofiber and/or the carboxymethylated cellulose nanofiber. This causes strong interaction of the hydrophilic group of the surfactant serving as Component (B) and the carboxy group of the carboxy group-containing cellulose nanofiber, and thus the compatibility of the cellulose nanofiber with the rubber component serving as Component (D) can be improved and the cellulose nanofiber can be uniformly dispersed in the rubber component. Consequently, the strength of the rubber composition can be remarkably improved.

Component (A) may be a mixture of the modified cellulose nanofiber and a water-soluble polymer. Examples of the water-soluble polymer include cellulose derivatives (for example, carboxymethylcellulose, methylcellulose, hydroxypropylcellulose, and ethylcellulose), xanthan gum, xyloglucan, dextrin, dextran, carrageenan, locust bean gum, alginic acid, alginates, pullulan, starch, potato starch, arrowroot flour, positive starch, phosphorylated starch, corn starch, arabic gum, gellan gum, gellan gum, polydextrose, pectin, chitin, water soluble chitin, chitosan, casein, albumin, soy protein lysate, peptone, polyvinyl alcohol, polyacrylamide, sodium polyacrylate, polyvinyl pyrrolidone, polyvinyl acetate, polyamino acid, polylactic acid, polymalic acid, polyglycerol, latex, rosin-based sizing agents, petroleum resin-based sizing agents, urea resins, melamine resins, epoxy resins, polyamide resins, polyamide-polyamine resins, polyethyleneimine, polyamine, vegetable gum, polyethylene oxide, hydrophilic crosslinked polymers, polyacrylates, starch polyacrylic acid copolymers, tamarind gum, guar gum, and colloidal silica and mixtures thereof. Of these water-soluble polymers, carboxymethyl cellulose or the salts thereof are preferable from the viewpoints of solubility.

<Component (B): Surfactant>

By including a surfactant in the rubber composition, the modified cellulose nanofiber can be uniformly dispersed in the rubber component and thus the strength of the rubber composition can be improved.

The surfactant means a material that may have at least one hydrophilic group and at least one hydrophobic group in a molecule and the precursor (for example, a material that can have both groups in the presence of a metal salt) thereof. Examples of the surfactant include cationic surfactants, anionic surfactants, nonionic surfactants, and amphoteric surfactants.

Examples of the cationic surfactant include aliphatic amines (for example, monoalkylamines such as oleylamine, stearylamine, tetradecylamine, 1-hexenylamine, 1-dodecenylamine, 9,12-octadecadienylamine (linoleic amines), 9,12,15-octadecatrienylamine, linoleylamine, dodecylamine, propylamine, and methylamine, dialkylamines, and trialkylamines), tetramethylammonium salts (for example, tetramethylammonium chloride and tetramethylammonium hydroxide), tetrabutylammonium salts (for example, tetrabutylammonium chloride), alkyltrimethylammonium salts (for example, alkyltrimethylammonium chloride, octyltrimethylammonium chloride, decyltrimethylammonium chloride, dodecyl trimethyl ammonium chloride, tetradecyltrimethylammonium chloride, cetyltrimethylammonium chloride, stearyltrimethylammonium chloride, alkyltrimethylammonium bromides, and hexadecyltrimethylammonium bromide), benzyltrialkylammonium salts (for example, benzyltrimethylammonium chloride, benzyltriethylammonium chloride, benzalkonium chloride (dodecyldimethylbenzylammonium chloride), and benzalkonium bromide), dibenzyldialkylammonium salt (for example, benzethonium chloride), dialkyldimethylammonium salts (for example, didecyldimethylammonium chloride and distearyldimethylammonium chloride), alkyl pyridinium salts (for example, butylpyridinium chloride, dodecylpyridinium chloride, and cetylpyridinium chloride), aliphatic amine salts (for example, monomethylamine hydrochloride, dimethylamine hydrochloride, and trimethylamine hydrochloride).

Examples of the anionic surfactant include carboxylic acids (for example, sodium octanoate, sodium decanoate, sodium laurate, sodium myristate, sodium palmitate, sodium stearate, perfluorononanoic acid, sodium N-lauroylsarcosine, sodium cocoylglutamate, and α-sulfo fatty acid methyl ester salts), sulfonic acids (for example, sodium 1-hexanesulfonate, sodium 1-octanesulfonate, sodium 1-decanesulfonate, sodium 1-dodecanesulfonate, perfluorobutane sulfonic acid, sodium linear alkylbenzenesulfonates, sodium toluenesulfonate, sodium cumenesulfonate, sodium octylbenzenesulfonate, sodium naphthalenesulfonate, disodium naphthalenedisulfonate, trisodium naphthalenetrisulfonate, and sodium butylnaphthalenesulfonate), sulfuric esters (for example sodium lauryl sulfate, sodium myristyl sulfate, sodium laureth sulfate, sodium polyoxyethylenealkylphenol sulfonates, and ammonium lauryl sulfate), and phosphoric acid esters (for example, lauryl phosphate, sodium lauryl phosphate, and potassium lauryl phosphate).

Examples of the nonionic surfactant include glycerol fatty acid esters (for example, glycerin laurate and glycerin monostearate), sorbitan fatty acid esters, polyoxyethylene alkyl ethers (for example, pentaethylene glycol monododecyl ether and octaethylene glycol monododecyl ether), alkylphenol alkylates (for example, polyoxyethylene alkylphenyl ethers, octylphenol ethoxylate, and nonylphenol ethoxylate), polyoxyalkylene glycol (for example, polyoxyethylene polyoxypropylene glycol), polyoxyalkylene sorbitan fatty acid esters (for example, polyoxyethylene sorbitan fatty acid esters, polyoxyethylene hexitan fatty acid esters, and sorbitan fatty acid ester polyethylene glycol), alkanolamides (for example, lauric acid diethanolamide, oleic acid diethanolamide, stearic acid diethanolamide, and cocamide DEA), and alkyl glucosides (for example, octyl glucoside, decyl glucoside, and lauryl glucoside).

Examples of the amphoteric surfactant include a higher alcohol (for example, cetanol, stearyl alcohol, and oleyl alcohol), betaine compounds (for example, lauryl dimethylamino acetic acid betaine, stearyldimethylamino acetic acid betaine, dodecylaminomethyldimethylsulfopropyl betaine, octadecylaminomethyldimethylsulfopropyl betaine, cocamidopropyl betaine, cocamidopropylhydroxy betaine, and 2-alkyl-N-carboxymethyl-N-hydroxyethylimidazolinium betaines), alkylamino acid salts (for example, sodium lauroylglutamate, potassium lauroylglutamate, and lauroylmethyl-β-alanine), alkylamine oxides (for example, lauryldimethylamine N-oxide and oleyldimethylamine N-oxide).

As the surfactants, the amphoteric surfactant and the cationic surfactant are preferable.

As the amphoteric surfactant, the betaine-based compounds are further preferable and dodecylaminomethyldimethylsulfopropyl betaine, octadecylaminomethyldimethylsulfopropyl betaine, and cocamidopropyl betaine are furthermore preferable.

Component (B) preferably includes at least one aliphatic amine and a derivative thereof. The aliphatic amine is not particularly limited and preferably satisfies at least one condition and more preferably satisfies all conditions selected from the group consisting of being a number of carbon atoms of 20 or smaller (preferably from 2 to 20 or from 3 to 20, more preferably from 10 to 20, further preferably from 12 to 20, further more preferably from 14 to 20, and particularly preferably from 15 to 20), containing least one (preferably one) unsaturated bond in the structure thereof, and being a primary amine (monoalkylamine). Examples of the aliphatic amine include monoalkylamines such as oleylamine, stearylamine, tetradecylamine, 1-hexenylamine, 1-dodecenylamine, 9,12-octadecadienylamine (linoleic amines), 9,12,15-octadecatrienylamine, linoleylamine, dodecylamine, propylamine, and methylamine; dialkylamines; trialkylamines; and salts thereof (for example, hydrochloride). At least one amine selected from the group consisting of oleylamine, stearylamine, dodecylamine, tetradecylamine, and propylamine is preferable and oleylamine is more preferable. Examples of the derivatives of an aliphatic amine include the compounds other than the examples other than the aliphatic amine exemplified as the specific examples of the cationic surfactants.

Component (B) may be one surfactant or a combination of two or more of the surfactants.

<Component (C): Polyvalent Metal>

By including Component (C) in the rubber composition, the separation of the modified cellulose nanofiber in the rubber composition can be reduced. In the case where Component (A) includes the carboxy group-containing cellulose nanofiber such as the oxidized cellulose nanofiber and the carboxymethylated cellulose nanofiber, the polyvalent metal allows the carboxy group-containing cellulose nanofiber to be effectively crosslinked with each other because the polyvalent metal forms ionic bonds with the carboxy groups in the carboxy group-containing cellulose nanofiber. Consequently, the separation of the cellulose nanofiber can be further reduced.

The polyvalent metal is usually a divalent or trivalent metal. Examples of the polyvalent metal include divalent metals such as calcium and magnesium and trivalent metals such as aluminum. Of these metals, trivalent metals are preferable and, aluminum is more preferable. The polyvalent metals may be in the form of metal salts such as chlorides, sulfates, and nitrates. Appropriate metal salts can be used based on the application of the obtained rubber composition. As the metal salts of the polyvalent metals, divalent or trivalent metal salts are preferable. Examples of the divalent and trivalent metal salts include divalent metal salts such as calcium salts (for example, calcium chloride and calcium nitrate and preferably calcium chloride) and magnesium salts (for example, magnesium sulfate) and trivalent metal salts such as aluminum salts (for example, aluminum chloride and aluminum sulfate). The trivalent metal salts are preferable and calcium salts and aluminum salts are more preferable.

Component (C) may be one polyvalent metal or a combination of two or more polyvalent metals.

<Component (D): Rubber Component>

The rubber component is a raw material of rubber and refers to a material that is crosslinked to be rubber. As the rubber component, the rubber component for natural rubber and the rubber component for synthetic rubber exist. Examples of the rubber component for natural rubber include narrowly-defined natural rubber that is not subjected to chemical modification (NR); chemically modified natural rubber such as chlorinated natural rubber, chlorosulfonated natural rubber, and epoxidized natural rubber; hydrogenated natural rubber; and deproteinized natural rubber. Examples of the rubber component for synthetic rubber include diene-based rubber such as butadiene rubber (BR), styrene-butadiene copolymer rubber (SBR), isoprene rubber (IR), acrylonitrile-butadiene rubber (NBR), chloroprene rubber, styrene-isoprene copolymer rubber, styrene-isoprene-butadiene copolymer rubber, and isoprene-butadiene copolymer rubber; and non-diene rubber such as butyl rubber (IIR), ethylene-propylene rubber (EPM and EPDM), acrylic rubber (ACM), epichlorohydrin rubber (CO and ECO), fluororubber (FKM), silicone rubber (Q), urethane rubber (U), and chlorosulfonated polyethylene (CSM). Of these rubbers, NBR, NR, SBR, chloroprene rubber, and BR are preferable.

Component (D) may be a single component alone or a combination of two or more components.

<Composition>

Each of the contents of Components (A) to (D) in the rubber composition is not particularly limited. Preferable contents are as follows.

The content of Component (A) is preferably 1 part by mass or larger, more preferably 2 parts by mass or larger, and further preferably 3 parts by mass or larger relative to 100 parts by mass of Component (D). This allows the improvement effect in the tensile strength to be exhibited sufficiently. The upper limit of the content is preferably 50 parts by mass or smaller, preferably 40 parts by mass or smaller, and further preferably 30 parts by mass or smaller. This allows the processability in the production process to be retained. Therefore, the content is preferably from 1 part by mass to 50 parts by mass, more preferably from 2 parts by mass to 40 parts by mass, and further preferably from 3 parts by mass to 30 parts by mass.

The content of Component (B) is preferably 5 parts by mass or larger, more preferably 20 parts by mass or larger, and further preferably 40 parts by mass or larger relative to 100 parts by mass of Component (A). This allows the improvement effect in the tensile strength to be exhibited sufficiently. The upper limit of the content is preferably 100 parts by mass or smaller, more preferably 85 parts by mass or smaller, further preferably 80 parts by mass or smaller, and further more preferably 70 parts by mass or smaller. This allows the processability in the production process to be retained. Therefore, the content is preferably from 5 parts by mass to 100 parts by mass, more preferably from 20 parts by mass to 85 parts by mass, further preferably from 20 parts by mass to 80 parts by mass, and further more preferably from 40 parts by mass to 70 parts by mass.

The content of Component (C) is preferably 0.01 part by mass or larger, more preferably 0.05 part by mass or larger, and further preferably 0.1 part by mass or larger relative to 100 parts by mass of Component (A). This allows the improvement effect in the tensile strength to be exhibited sufficiently. The upper limit of the content is preferably 5 parts by mass or smaller, preferably 1 part by mass or smaller, and further preferably 0.5 part by mass or smaller. This allows the processability in the production process to be retained. Therefore, the content is preferably from 0.01 part by mass to 5 parts by mass, more preferably from 0.05 part by mass to 1 part by mass, and further preferably from 0.1 part by mass to 0.5 part by mass.

<Optional Component>

The rubber composition may include one or more optional components depending on the application or the like of the rubber composition described later. Examples of the optional components include compounding agents that may be used in the rubber industry such as reinforcing agents (for example, carbon black and silica), silane coupling agents, crosslinking agents, vulcanization accelerators, vulcanization accelerator aids (for example, zinc oxide and stearic acid), oils, hardened resins, waxes, antioxidants, and coloring agents. Of these optional components, the vulcanization accelerators and the vulcanization accelerator aids are preferable. The content of the optional components may be appropriately determined depending on the type of optional components and is not particularly limited.

In the case where the rubber composition is an unvulcanized rubber composition or a final product, the rubber composition preferably includes a crosslinking agent. Examples of the crosslinking agent include sulfur, sulfur halide, organic peroxides, quinone dioximes, organic polyvalent amine compounds, and alkylphenol resins having methylol groups. Of these crosslinking agents, sulfur is preferable. The content of the crosslinking agent is preferably 1.0 part by mass or larger, more preferably 1.5 parts by mass or larger, and further preferably 1.7 parts by mass or larger relative to 100 parts by mass of Component (D). The upper limit of the content is preferably 10 parts by mass or smaller, preferably 7 parts by mass or smaller, and further preferably 5 parts by mass or smaller.

Examples of the vulcanization accelerator include N-t-butyl-2-benzothiazole sulfenamide and N-oxydiethylene-2-benzothiazolyl sulfenamide. The content of the vulcanization accelerator is preferably 0.1 part by mass, more preferably 0.3 part by mass or larger, and further preferably 0.4 part by mass or larger relative to Component (D). The upper limit of the content is preferably 5 parts by mass or smaller, preferably 3 parts by mass or smaller, and further preferably 2 parts by mass or smaller.

In the rubber composition, Components (A) to (D) and the optional components may exist independently or may exists as a complex such as a reaction product made of at least two components. The content of each component in the rubber composition is usually in accordance with an amount to be used as the raw material.

<Applications>

The application of the rubber composition according to the present invention is not particularly limited as long as the composition may be a composition for obtaining rubber serving as a final product. In other words, the application may be an intermediate for rubber production (masterbatch), may be an unvulcanized rubber composition including the vulcanizing agent, or rubber as the final product. The application of the final product is not particularly limited. Examples of the application include transport machines such as automobiles, trains, ships, and airplanes; electrical appliances such as personal computers, televisions, telephones, and watches; mobile communication devices such as mobile phones; portable music playback devices, video playback devices, printing devices, copying devices, and sporting goods; building materials; office machines such as stationeries, vessels, and containers. Other than these applications, the rubber composition can be applied to members for which rubber or soft plastic is used and is suitably used for tires. Examples of the tires include pneumatic tires for passenger cars, trucks, buses, and heavy vehicles.

<Production Method>

The present invention provides a production method including the following steps:

Step (a): A step of obtaining a mixture by mixing the rubber component with the modified cellulose nanofiber;

Step (b): A step of adding the surfactant to the mixture; and

Step (c): A step of adding the polyvalent metal to the mixture before or after adding the surfactant and coagulating the resultant mixture to obtain a coagulated product.

According to the method of the present invention, the rubber composition according to the present invention described above can be efficiently produced. Here, the specific examples and the amounts to be used of the modified cellulose nanofiber, the surfactant, the polyvalent metal, and the rubber component in the method according to the present invention are the same as the specific examples and the amounts to be used each described as Components (A) to (D) of the rubber composition.

In Step (a), the solid rubber component may be subjected to mixing or the dispersion liquid (latex) in which the rubber component is dispersed in a dispersion medium or the solution in which the rubber component is dissolved in a solvent may be subjected to mixing. Examples of the dispersion medium and the solvent (hereinafter, collectively referred to as "liquid") include water and organic solvents. The amount of the liquid is preferably from 10 parts by mass to 1,000 parts by mass relative to 100 parts by mass of the rubber component (the total amount of the rubber components when two or more rubber components are used).

The mixing can be carried out using known apparatuses such as a homomixer, a homogenizer, and a propeller stirrer. The temperature for the mixing is not limited, and room temperature (20° C. to 30° C.) is preferable. The mixing time may also be appropriately adjusted.

The modified cellulose nanofiber can be subjected to mixing in the form of a dispersion liquid in which the modified cellulose nanofiber are dispersed in a dispersion medium, a dried solid of the dispersion liquid, and a wet solid of the dispersion liquid. The concentration of the modified cellulose nanofiber in the dispersion liquid when the dispersion medium may be from 0.1% to 5% (w/v) in the case of water serving as the dispersion medium and may be from 0.1% to 20% (w/v) in the case where the dispersion medium includes water and an organic solvent such as alcohol. The wet solid refers to the solid of an intermediate aspect between the dispersion liquid and the dried solid. The amount of the dispersion medium in the wet solid obtained by dehydrating the dispersion liquid in a usual manner is preferably from 5% by mass to 15% by mass relative to the modified cellulose. The amount of the dispersion medium, however, can be appropriately adjusted by addition of a liquid or further drying.

The modified cellulose nanofiber may be a combination of two or more types of the modified cellulose nanofibers. In the case of the mixture of the modified cellulose nanofiber and the water-soluble polymer solution, a mixed liquid, the dried solid of the mixed liquid, and the wet solid of the mixed liquid can be subjected to mixing. The amount of liquid in the mixed liquid and the dried solid may be in the above range.

In Step (b), the surfactant is added to the mixture obtained in Step (a). During the addition and after the addition, the mixture may be subjected to stirring, if necessary. The surfactant may be used singly or in combination of two or more of the surfactants.

In Step (c), the polyvalent metal is added to the mixture. The polyvalent metal is added before, simultaneously, or after addition of the surfactant and is preferably added after the addition of the surfactant. The concentration of the polyvalent metal (the total amount thereof in the case of using two or more polyvalent metals) in the mixture is preferably adjusted from 0.1% by mass to 3.0% by mass and more preferably from 0.3% by mass to 2.0% by mass.

In Step (c), an acid may be used in combination with the polyvalent metal. The acid may be any of organic acids and inorganic acids and is not particularly limited as long as the acid does not inhibit coagulation. Examples of the organic acids include formic acid and acetic acid. Examples of the inorganic acids include sulfuric acid, hydrochloric acid, and carbonic acid. The acid may be appropriately selected in accordance with the polyvalent metal to be used in combination. The acid may be used singly or in combination of two or more of the acids.

In the case where the acid is used, timing of the addition of the acid is not particularly limited. The acid may be added simultaneously with the polyvalent metal or may be added before or after the addition of the multivalent metal. The amount of the acid to be used is preferably an amount that the pH of the mixed liquid is from 3.0 to 6.0 and more preferably an amount that the pH is from 3.5 to 5.0.

After coagulation, the coagulated product may be dehydrated (dried). A method for dehydration is not particularly limited and is preferably by heat treatment. The conditions of the heat treatment are not particularly limited and an example of the conditions is as follows. The heating temperature is preferably 40° C. or higher and lower than 100° C. The treatment time is preferably from 1 hour to 24 hours. By setting the conditions to the above-described conditions, damage to the rubber component may be reduced. Solid-liquid separation (for example, filtration (preferably, filtration using a filter (a sieve opening is usually from 0.1 μm to 1.0 μm, 0.3 μm to 0.8 μm, or 0.4 μm to 0.6 μm)) may be carried out before dehydration. The mixture after drying may be in a bone-dry state or may be in a state where the solvent remains. A method for removing the solvent other than dehydration is not particularly limited and the removal may be carried out by conventionally known methods. Examples of the method include a method of coagulating the mixture by adding the acid or a salt and dehydrating, washing, and drying the coagulated product.

The recovered coagulated product is preferably washed. This allows the impurities to be efficiently removed and thus can lead to a variety of performance improvement of the rubber composition.

The recovered coagulated product is preferably utilized as a masterbatch. In the case where the coagulated product is utilized as a final product, it is preferable that the rubber component be additionally added, the above-described optional components be added, if necessary, and the resultant mixture be mixed (for example, mastication and kneading).

The temperature during the mixing (for example, during mastication and kneading) may be about normal temperature (for example, from about 15° C. to about 30° C.) or may be a high temperature by heating so as not to cause crosslinking reaction of the rubber component. For example, the temperature is 140° C. or lower and more preferably 120° C. or lower. The lower limit of the temperature is usually 40° C. or higher and preferably 60° C. or higher. Therefore, the heating temperature is preferably from about 40° C. to about 140° C. and more preferably from about 60° C. to about 120° C. The mixing may be carried out using apparatuses such as a Banbury mixer, a kneader, and an open roll.

After completion of the mixing, molding may be carried out, if necessary. Examples of the molding apparatus include apparatuses for die molding, injection molding, extrusion molding, blow molding, and foam molding. The molding apparatus may be appropriately selected depending on the shape of the final product, applications, and a molding method.

In the mixing step, the mixed product is heated after mixing and preferably after molding. In the case where the rubber composition includes the crosslinking agent (preferably the crosslinking agent and the vulcanization accelerator), a crosslinking (vulcanization) process is carried out by heating. In the case where the rubber composition is free from the crosslinking agent and the vulcanization accelerator, the same effect can be obtained if these components are added to the rubber composition before heating. The heating temperature is preferably 150° C. or higher and the upper limit of the heating temperature is preferably 200° C. or lower and more preferably 180° C. or lower. Therefore, the heating temperature is preferably from about 150° C. to about 200° C. and more preferably from about 150° C. to about 180° C. Examples of the heating device include vulcanization apparatuses used for, for example, mold vulcanization, autoclave vulcanization, and continuous vulcanization.

Before the coagulated product is served as the final product, the coagulated product may be subjected to finishing treatment, if necessary. Examples of the finishing treatment include grinding, surface treatment, lip finishing, lip cut, and chlorine treatment. Of these types of the treatment, single treatment alone may be carried out or a combination of two or more types of the treatment may be carried out.

EXAMPLE

Hereinafter, the present invention will be described further in detail with reference to Examples. The present invention, however, is not limited thereto.

<Production Example 1> Preparation of Oxidized Cellulose Nanofiber

Bone-dry, 5.00 g of bleached non-beaten kraft pulp originated from softwood (a degree of whiteness 85%) was added to 500 ml of an aqueous solution in which 39 mg (0.05 mmol relative to 1 g of bone-dry cellulose) of TEMPO (manufactured by Sigma Aldrich Co.) and 514 mg of sodium bromide (1.0 mmol relative to 1 g of bone-dry cellulose) were dissolved and the resultant mixture was stirred until the pulp was uniformly dispersed. An aqueous solution of sodium hypochlorite was added to the reaction system so that the concentration of sodium hypochlorite was reached to 5.5 mmol/g to start oxidation reaction at room temperature. During the reaction, the pH in the system lowered and thus a 3 M sodium hydroxide aqueous solution was sequentially added to adjust the pH at 10. The reaction was completed when sodium hypochlorite was consumed and the pH in the system was ceased to change. The mixture after the reaction was filtered with a glass filter to separate the pulp and the separated pulp was sufficiently washed with water to give oxidized pulp (oxidized (carboxylated) cellulose). The yield of the pulp at this time was 90%. The time required for the oxidation reaction was 90 minutes and the carboxy group content was 1.6 mmol/g. The concentration of this pulp was adjusted with water to 1.0% (w/v). The resultant mixture was treated with an ultrahigh pressure homogenizer (20° C., 150 MPa) three times to give an oxidized (carboxylated) cellulose nanofiber dispersion liquid. The average fiber diameter was 3 nm and the aspect ratio was 250. HCl was added to this salt-type cellulose nanofiber aqueous dispersion liquid until the pH was reached to 2.4 to give a gel-like agglomerate. The agglomerate was dehydrated and sufficiently washed with water. Thereafter water was added again and the resultant mixture was treated with a mixer to give a slurry having a solid content concentration of 1% by mass. This slurry was treated three times with an ultrahigh pressure homogenizer (treatment pressure 140 MPa) to give an aqueous dispersion liquid of the acid type cellulose nanofiber (1% by mass) after washing.

<Production Example 2> Production of Carboxymethylated Cellulose Nanofiber

Into a stirrer capable of mixing pulp, 200 g as dry mass of pulp (NBKP (softwood bleached kraft pulp), manufactured by Nippon Paper Industries Co., Ltd.) and 111 g as dry mass of sodium hydroxide (2.25 times by mole per anhydrous glucose residue of the starting material) were added and water was added so that the pulp solid content was 20% (w/v). Thereafter, the resultant mixture was stirred at 30° C. for 30 minutes, and then 216 g of sodium monochloroacetate (in terms of active component, 1.5 times by mole per glucose residue of the pulp) was added. After the resultant mixture was stirred for 30 minutes, the temperature was raised to 70° C. and the mixture was stirred for 1 hour. Thereafter, the reaction product was taken out, neutralized, and washed to give carboxymethylated pulp having a degree of substitution with carboxymethyl group per glucose unit of 0.25. This product was diluted with water so that a solid content was 1% and the diluted mixture was treated five times with a high pressure homogenizer at 20° C. and at a pressure of 150 MPa to give defibrated carboxymethylated cellulose nanofiber. The average fiber diameter was 15 nm and the aspect ratio was 50. To this salt-type cellulose nanofiber aqueous dispersion liquid, a cation exchange resin (AMBERJET 1020, manufactured by ORGANO CORPORATION) was added until the pH was reached to 2.9 and the resultant mixture was stirred. The cation exchange resin was collected by suction filtration to give an acid type cellulose nanofiber aqueous dispersion liquid (1% by weight).

<Production Example 3> Production of Cationized Cellulose Nanofiber

Into a pulper capable of mixing pulp, 200 g as dry mass of pulp (NBKP, manufactured by Nippon Paper Industries Co., Ltd.) and 24 g as dry mass of sodium hydroxide were added and water was added so that the pulp solid concentration was 15%. Thereafter, the resultant mixture was stirred at 30° C. for 30 minutes and thereafter the temperature of the resultant mixture was raised to 70° C. To this mixture, 200 g (in terms of the active component) of 3-chloro-2-hydroxypropyltrimethylammonium chloride acting as the cationizing agent was added. After reacting the mixture for 1 hour, the reaction product was taken out, neutralized, and washed to give cation-modified pulp having a degree of substitution with cationic group of 0.05 per glucose unit. The solid concentration of this cation-modified pulp was adjusted to 1% and the resultant mixture was treated two times with a high pressure homogenizer at 20° C. and at a pressure of 140 MPa. The average fiber diameter was 25 nm and the aspect ratio was 50. To this salt type cellulose nanofiber aqueous dispersion liquid, an anion-exchange resin was added until the pH was reached to 11 and the resultant mixture was stirred. The anion exchange resin (AMBERJET 4400, manufactured by ORGANO CORPORATION) was collected by suction filtration to give a base type cellulose nanofiber aqueous dispersion liquid (1% by weight).

<Production Example 4> Production of Oxidized Cellulose Nanofiber

The salt type cellulose nanofiber aqueous dispersion liquid obtained in the course of Production Example 1 was used as it was.

Here, the amount of the carboxy group, the degree of substitution with carboxymethyl group, and the degree of substitution with cationic group in the above Production Examples were measured by the methods described in the upper parts.

Example 1

1000 g of the aqueous dispersion liquid of the oxidized cellulose nanofiber having a solid content concentration of 1% obtained in Production Example 1 and 500 g of natural rubber latex dispersion liquid having a solid content concentration of 10% were mixed so that the mass ratio of rubber component:oxidized cellulose nanofiber=100:20. The resultant mixture was stirred for 10 minutes using TK homomixer (8,000 rpm). To this mixed liquid, 4.15 g of oleyl amine was further added with stirring using TK homomixer (4,000 rpm), and the resultant mixed liquid was stirred for 30 minutes. To the mixture, a 10% by mass aluminum sulfate aqueous solution was further added until the concentration of aluminum sulfate was reached to 0.35% by mass with stirring using Three-One Motor (from 150 rpm to 300 rpm). The obtained mixture was subjected to solid-liquid separation through a nylon mesh having a sieve opening of 5 μm. Thereafter, the filtered residue was washed with ion-exchanged water and dried in a heating oven at 70° C. for 10 hours to give a masterbatch.

To this masterbatch, solid natural rubber was added so that the mass ratio of rubber component:modified cellulose nanofiber is 100:5 and 168 g of the resultant mixture was kneaded using an open roll (manufactured by KANSAI ROLL Co., Ltd.) at 40° C. for 5 minutes. Subsequently, 0.7 g (0.5 part by mass relative to 100 parts by mass of the rubber component) of stearic acid, 8.4 g (6 parts by mass relative to 100 parts by mass of the rubber component) of zinc oxide, 4.9 g (3.5 parts by mass relative to 100 parts by mass of the rubber component) of sulfur, and 1 g (0.7 part by mass relative to 100 parts by mass of the rubber component) of the vulcanization accelerator (manufactured by Ouchi Shinko Chemical Industrial Co., MSA-G, N-oxydiethylene-2-benzothiazolyl sulfenamide)) were added and the resultant mixture was kneaded using the open roll (manufactured by KANSAI ROLL Co., Ltd.) at 60° C. for 10 minutes to give a sheet of an unvulcanized rubber composition.

This sheet was sandwiched between molds and press-vulcanized at 150° C. for 10 minutes to give the sheet of a vulcanized rubber composition having a thickness of 2 mm. This sheet was cut into a test piece having a predetermined shape and tensile strength, which is one of the reinforcing properties, was measured in accordance with JIS K6251 "Rubber, vulcanized or thermoplastics-Determination of tensile stress-strain properties". As each value becomes higher, vulcanized rubber compositions are reinforced better and thus the higher value indicates excellent mechanical strength of the rubber.

Example 2

Example 2 was carried out by the same method as the method in Example 1 except that calcium chloride was used instead of aluminum sulfate.

Comparative Example 1

Comparative Example 1 was carried out by the same method as the method in Example 1 except that oleylamine was not added.

Comparative Example 2

Comparative Example 2 was carried out by the same method as the method in Example 1 except that oleylamine was not added and that calcium chloride was used instead of aluminum sulfate.

Comparative Example 3

Comparative Example 3 was carried out by the same method as the method in Example 1 except that aluminum sulfate was not added and that the solid-liquid separation was not carried out.

Comparative Example 4

Comparative Example 4 was carried out by the same method as the method in Example 1 except that oleylamine was not added, that aluminum sulfate was not added, and that the solid-liquid separation was not carried out.

The results of Examples 1 and 2 and Comparative Examples 1 to 4 are listed in Table 1. Both breaking stress and stress of each midpoint in Examples are well-balanced and high. Of these properties, the 100% midpoint stress and the 300% midpoint stress in both Examples are higher than these properties in the Comparative Examples. In each Example, lowering in maximum point elongation was not observed. These results indicate that the rubber composition according to the present invention has excellent strength.

Example 3

Example 3 was carried out by the same method as the method in Example 1 except that the amount of added oleylamine was half of the amount in Example 1.

Example 4

Example 4 was carried out by the same method as the method in Example 1 except that the amount of added oleylamine was twice the amount in Example 1.

Example 5

Example 5 was carried out by the same method as the method in Example 1 except that the oxidized cellulose nanofiber obtained in Production Example 4 were used instead of the oxidized cellulose nanofiber obtained in Production Example 1.

Example 6

Example 6 was carried out by the same method as the method in Example 1 except that stearylamine was used instead of oleylamine.

Example 7

Example 7 was carried out by the same method as the method in Example 1 except that dodecylamine was used instead of oleylamine.

Example 8

Example 8 was carried out by the same method as the method in Example 1 except that tetradecylamine was used instead of oleylamine.

Example 9

Example 9 was carried out by the same method as the method in Example 1 except that propylamine was used instead of oleylamine.

The results of Examples 3 to 9 are listed in Table 2. Both breaking stress and stress of each midpoint in Examples are well-balanced and high. Lowering in maximum point elongation was not observed. These results indicate that the rubber compositions according to the present invention have excellent strength.

TABLE 1

|  | Yield (%) | Breaking stress (MPa) | Maximum point elongation (% GL) | 50% Midpoint stress (MPa) | 100% Midpoint stress (MPa) | 300% Midpoint stress (MPa) |
|---|---|---|---|---|---|---|
| Example 1 | 98 | 24.3 | 494 | 1.3 | 2.3 | 8.3 |
| Example 2 | 97 | 23.6 | 501 | 1.2 | 2.2 | 7.5 |
| Comparative Example 1 | 99 | 18.8 | 574 | 0.7 | 1.1 | 4.4 |
| Comparative Example 2 | 95 | 23.5 | 612 | 0.8 | 1.5 | 4.9 |
| Comparative Example 3 | — | 22.8 | 512 | 1.2 | 2.1 | 6.5 |
| Comparative Example 4 | — | 24.0 | 575 | 0.9 | 1.6 | 5.9 |

TABLE 2

|  | Yield (%) | Breaking stress (MPa) | Maximum point elongation (% GL) | 50% Midpoint stress (MPa) | 100% Midpoint stress (MPa) | 300% Midpoint stress (MPa) |
|---|---|---|---|---|---|---|
| Example 3 | 95 | 25.7 | 561 | 1.1 | 2.0 | 7.5 |
| Example 4 | 99 | 17.9 | 456 | 1.4 | 2.3 | 8.4 |
| Example 5 | 96 | 25.6 | 536 | 1.3 | 2.3 | 7.4 |
| Example 6 | 97 | 22.0 | 526 | 1.1 | 2.0 | 7.2 |
| Example 7 | 98 | 22.1 | 515 | 1.2 | 2.1 | 7.4 |
| Example 8 | 98 | 24.3 | 526 | 1.2 | 2.1 | 7.6 |
| Example 9 | 97 | 23.2 | 530 | 1.2 | 2.0 | 7.1 |

Example 10

Example 10 was carried out by the same method as the method in Example 1 except that the carboxymethylated cellulose nanofiber obtained in Production Example 2 were used instead of the oxidized cellulose nanofiber obtained in Production Example 1.

Example 11

Example 11 was carried out by the same method as the method in Example 10 except that calcium chloride was used instead of aluminum sulfate.

Comparative Example 5

Comparative Example 5 was carried out by the same method as the method in Example 10 except that oleylamine was not added.

Comparative Example 6

Comparative Example 6 was carried out by the same method as the method in Example 10 except that oleylamine was not added and that calcium chloride was used instead of aluminum sulfate.

Comparative Example 7

Comparative Example 7 was carried out by the same method as the method in Example 10 except that aluminum sulfate was not added and that the solid-liquid separation was not carried out.

Comparative Example 8

Comparative Example 8 was carried out by the same method as the method in Example 10 except that aluminum sulfate was not added, that oleylamine was not added, and that the solid-liquid separation was not carried out.

The results of Examples 10 and 11 and Comparative Examples 5 to 8 are listed in Table 3. Both breaking stress and stress of each midpoint in Examples are well-balanced and high. Lowering in maximum point elongation was not observed. These results indicate that the rubber compositions according to the present invention have excellent strength.

TABLE 3

| | Yield (%) | Breaking stress (MPa) | Maximum point elongation (% GL) | 50% Midpoint stress (MPa) | 100% Midpoint stress (MPa) | 300% Midpoint stress (MPa) |
|---|---|---|---|---|---|---|
| Example 10 | 98 | 23.2 | 510 | 1.2 | 2.1 | 8.0 |
| Example 11 | 98 | 22.9 | 525 | 1.1 | 2.0 | 7.3 |
| Comparative Example 5 | 96 | 20.1 | 564 | 0.7 | 1.0 | 4.4 |
| Comparative Example 6 | 95 | 23.8 | 541 | 0.8 | 1.3 | 4.7 |
| Comparative Example 7 | — | 23.1 | 523 | 1.1 | 2.0 | 6.3 |
| Comparative Example 8 | — | 24.3 | 580 | 0.8 | 1.4 | 5.5 |

The invention claimed is:

1. A rubber composition, comprising:
    a modified cellulose nanofiber;
    a surfactant;
    a polyvalent metal; and
    a rubber component;
    wherein the content of the polyvalent metal is from 0.01 part by mass to 5 parts by mass relative to 100 parts by mass of the modified cellulose nanofiber.

2. The composition according to claim 1, wherein the modified cellulose nanofiber comprises an oxidized cellulose nanofiber.

3. The composition according to claim 2, wherein the content of carboxy groups in the oxidized cellulose nanofiber is from 0.5 mmol/g to 3.0 mmol/g relative to a bone-dry mass of the oxidized cellulose nanofiber.

4. The composition according to claim 1, wherein the modified cellulose nanofiber comprises a carboxymethylated cellulose nanofiber.

5. The composition according to claim 4, wherein a degree of substitution with carboxymethyl group per glucose unit of the carboxymethylated cellulose nanofiber is from 0.01 to 0.50.

6. The composition according to claim 1, wherein the surfactant comprises a cationic surfactant or an amphoteric surfactant.

7. The composition according to claim 6, wherein the cationic surfactant comprises an aliphatic amine.

8. The composition according to claim 7, wherein the aliphatic amine is at least one aliphatic amine selected from the group consisting of oleylamine, stearylamine, tetradecylamine, 1-hexenylamine, 1-dodecenylamine, 9,12-octadecadienylamine, 9,12,15-octadecatrienylamine, linoleylamine, dodecylamine, and propylamine.

9. The composition according to claim 1, wherein the polyvalent metal comprises at least one metal selected from divalent and trivalent metals.

10. The composition according to claim 1, wherein the rubber component comprises at least one rubber selected from the group consisting of a natural rubber, a modified natural rubber, a synthetic rubber, and a modified synthetic rubber.

* * * * *